United States Patent
Lawson, Jr.

(10) Patent No.: US 6,631,925 B1
(45) Date of Patent: Oct. 14, 2003

(54) MINIATURIZED MOTOR VEHICLE

(76) Inventor: William M. Lawson, Jr., P.O. Box 45020, Phoenix, AZ (US) 85064-5020

( * ) Notice: Subject to any disclaimer, the term of this patent is extended or adjusted under 35 U.S.C. 154(b) by 0 days.

(21) Appl. No.: 09/504,648

(22) Filed: Feb. 14, 2000

(51) Int. Cl.[7] .............................................. B62D 21/00
(52) U.S. Cl. ..................................... 280/781; 180/291
(58) Field of Search ................................ 280/827, 828, 280/781; 301/127, 124.1; 295/37, 44; 180/291

(56) References Cited

U.S. PATENT DOCUMENTS

| | | | | |
|---|---|---|---|---|
| 2,336,511 A | | 12/1943 | Stolte ........................... 280/37 |
| 2,415,596 A | | 2/1947 | Larison ........................ 180/22 |
| 2,468,316 A | | 4/1949 | Waters ......................... 180/54 |
| 3,684,046 A | * | 8/1972 | Begleiter ................... 180/26 R |
| 3,799,283 A | * | 3/1974 | Freber ......................... 180/56 |
| 3,829,117 A | | 8/1974 | Park ......................... 280/96.1 |
| 3,842,928 A | * | 10/1974 | Kishi ....................... 180/26 R |
| 4,217,970 A | | 8/1980 | Chika ......................... 180/289 |
| 4,475,618 A | * | 10/1984 | Kennedy et al. ............ 180/237 |
| 4,535,869 A | | 8/1985 | Tsutsumikoshi et al. .... 180/311 |
| 4,562,893 A | * | 1/1986 | Cunard ........................ 180/6.5 |
| 4,574,902 A | * | 3/1986 | Irimajiri ..................... 180/350 |
| 4,606,429 A | * | 8/1986 | Kurata ........................ 180/292 |
| 4,614,249 A | * | 9/1986 | Yamanaka ................... 180/312 |
| 4,629,023 A | | 12/1986 | Carpanelli et al. ............ 180/72 |
| 4,643,695 A | * | 2/1987 | Kennedy et al. ............ 446/427 |
| 4,682,668 A | * | 7/1987 | Salmon et al. ............... 180/209 |
| 4,798,400 A | | 1/1989 | Kosuge ....................... 280/796 |
| 4,861,058 A | * | 8/1989 | Cresswell ................... 280/278 |
| 4,973,075 A | * | 11/1990 | Rori et al. ............... 280/86.757 |
| 4,984,645 A | * | 1/1991 | White, Jr. .................. 180/65.6 |
| 5,036,938 A | * | 8/1991 | Blount et al. ................ 180/208 |
| 5,238,267 A | | 8/1993 | Hutchison et al. ........... 280/781 |
| 5,306,034 A | * | 4/1994 | Buchanan ............ 280/124.135 |
| 5,312,126 A | * | 5/1994 | Shortt et al. ................. 280/287 |
| 5,324,056 A | * | 6/1994 | Orton ................... 280/124.106 |
| 5,363,934 A | * | 11/1994 | Edmund et al. .............. 180/6.5 |
| 5,740,878 A | * | 4/1998 | Sala ............................ 180/291 |
| 5,836,597 A | * | 11/1998 | Schlosser et al. ....... 280/86.753 |
| 5,845,724 A | * | 12/1998 | Barrett ........................ 180/65.1 |
| 5,863,051 A | * | 1/1999 | Brenter ......................... 280/16 |
| 5,921,341 A | * | 7/1999 | Atkins ........................ 180/350 |
| 5,924,506 A | * | 7/1999 | Perego ....................... 180/65.5 |
| 5,984,356 A | * | 11/1999 | Uphaus ....................... 280/781 |
| 5,992,863 A | * | 11/1999 | Forbes-Robinson et al. ..... 280/86.751 |
| 6,007,126 A | * | 12/1999 | Blasingame et al. .......... 295/37 |
| 6,026,923 A | * | 2/2000 | Uphaus ....................... 180/312 |
| 6,105,982 A | * | 8/2000 | Howell et al. ............. 280/91.1 |

* cited by examiner

Primary Examiner—Lesley D. Morris
Assistant Examiner—L. Lum (57) ABSTRACT

A miniaturized motor vehicle includes a frame, a rear axle supporting a pair of rear wheels including a drive wheel, a motor mounted to the frame and coupled to the rear axle, and a front axle supporting a pair of front wheels. A steering assembly is rotatably mounted to the frame for steering the front wheels. The steering column assembly is readily removable. A seat is mounted to the frame and is adjustable in height to accommodate drivers of various sizes. The seat assembly is readily removable. A pair of footrests is mounted to the frame to provide a platform on which the driver can rest his feet and to more easily shift his weight. The motor is coupled to the rear axle, the rear axle is a live axle, and the rear axle is rigidly fixed to one of the rear wheels and is rotatably mounted to the other of the rear wheels. The steering assembly includes a steering bar and a steering column that is rotatably coupled to the frame at a point between the steering bar and the seat. The steering column is bent at an angle toward the front wheels of the vehicle. The weight of the motor vehicle is between about 30 pounds and about 50 pounds, and the wheel base is about 24 inches.

38 Claims, 10 Drawing Sheets

MINIATURIZED MOTOR VEHICLE

BACKGROUND

This invention relates to miniaturized motor vehicles. More particularly, it relates to a miniaturized motor vehicle that is capable of transporting a grown adult in a seated position, that is readily adjustable to accommodate drivers of different sizes, that is lightweight and easily stored or transported, such as in the trunk of a standard automobile, and that has good stability and maneuverability.

Previous four-wheeled motor vehicles of reduced size include vehicles for street or track use commonly known as "go-carts." Typically, go-carts have a seat that is fixed to the frame between the axles. The engine, which is generally a gasoline-powered single-cylinder engine, is located behind the seat and before the rear axle. The accelerator and foot-brake pedals are disposed close to the front axle a fixed distance from the seat.

One drawback of go-carts is that a single vehicle cannot be readily adapted to accommodate riders of various sizes. In go-carts, for example, the distance between the seat and the pedals is necessarily correlated with the driver's height. As a result, it requires multiple sizes of go-carts to accommodate persons of different sizes, from relatively short persons, such as children, to taller persons, such as adults.

Still another drawback of go-carts is that they are not of a size or weight so as to be easily stored in a small space or readily transportable. Generally, a delivery van or other vehicle having a large cargo area is required for transporting a go-cart inside the vehicle. To transport a go-cart using a conventional automobile, a trailer or external mounting rack is required.

Typically, the driver of a go-cart is seated very close to the ground. While this provides stability, it makes it difficult for drivers in other, higher profile vehicles to see the go-cart. Also, because a go-cart driver is so low to the ground, the driver is often pelted with debris from the road when operating the vehicle.

Also, the structure of go-carts makes it difficult for the driver to transfer his weight while driving, in order to better maneuver the vehicle. The driver can shift his weight to some extent from side to side, e.g., he can shift his weight into a turn as he steers through the turn. However, a go-cart does not allow the driver to shift his weight as freely from side to side as he might desire, and he can't transfer his weight from front to rear, because the driver must always keep his feet on the pedals while his legs are stretched out. Thus, the structure of go-carts allows for the driver to transfer his weight only to a reduced extent while driving the vehicle.

There is a need, therefore for a small, high-visibility, stable, maneuverable, four-wheeled motorized vehicle. Accordingly, it is an object of this invention to provide such a motor vehicle.

Yet another object of the invention is to provide a motor vehicle that is lightweight and can be easily stored or transported in a small space, such as in the trunk of a standard automobile.

Still another object of the invention is to provide a motor vehicle that, while being small in size and lightweight, is capable of transporting a grown adult in a seated position and can be readily and conveniently adjusted to accommodate drivers of various sizes.

Another object of the present invention is to provide a miniaturized motor vehicle that allows the driver to more freely shift his weight to maneuver the vehicle during operation.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, I have provided a miniaturized motor vehicle that includes a frame, a rear axle supporting a pair of rear wheels including a drive wheel, a motor mounted to the frame and coupled to the rear axle, and a front axle supporting a pair of front wheels. A steering assembly is rotatably mounted to the frame for steering the front wheels. The steering column assembly is readily removable. A seat is mounted to the frame and is adjustable in height to accommodate drivers of various sizes. The seat assembly is readily removable. A pair of footrests is mounted to the frame to provide a platform on which the driver can rest his feet and to more easily shift his weight.

In accordance with one aspect of the invention, the motor is coupled to the rear axle, the rear axle is a live axle, and the rear axle is rigidly fixed to one of the rear wheels and is rotatably mounted to the other of the rear wheels.

In accordance with another aspect of the invention, the steering assembly includes a steering bar and a steering column that is rotatably coupled to the frame at a point between the steering bar and the seat. Preferably, the steering column is bent at an angle toward the front wheels of the vehicle.

In accordance with yet another aspect of the invention, the weight of the motor vehicle is between about 30 pounds and about 50 pounds and the wheelbase is about 24 inches.

BRIEF DESCRIPTION OF THE DRAWINGS

The accompanying drawings, which are incorporated in and constitute a part of the specification, illustrate the presently preferred embodiments and methods of the invention. Together with the general description given above and the detailed description of the preferred embodiments and methods given below, they serve to explain the principles of the invention.

DESCRIPTION

Reference will now be made in detail to the presently preferred embodiments and methods of the invention as illustrated in the accompanying drawings, in which like reference characters designate like or corresponding parts throughout the drawings.

In the drawings, a miniaturized motor vehicle according to the present invention is generally identified by reference numeral 10. Referring to FIGS. 1 through 4, the motor vehicle 10 includes a body 11 mounted on a frame 12, which is preferably of the tubular type. Front wheels 14 are rotatably mounted to a front axle 16, which is fixed to the frame 12. Rear wheels 18, 19 are mounted to a rear axle 20, which is mounted on bearings 22 attached to the frame 12. A seat assembly 24 is mounted to the frame, preferably forward of the rear axle 20, thereby improving front-to-rear stability during acceleration and braking. The seat assembly 24 includes a seat 26 mounted to a seat support member 28, which is adjustably and removably mounted to the frame 12, as described in more detail below. A steering assembly 30 also is removably mounted to the frame 12 between the seat assembly 24 and the front axle 16, also as discussed in more detail below.

The Frame

Figure 1:
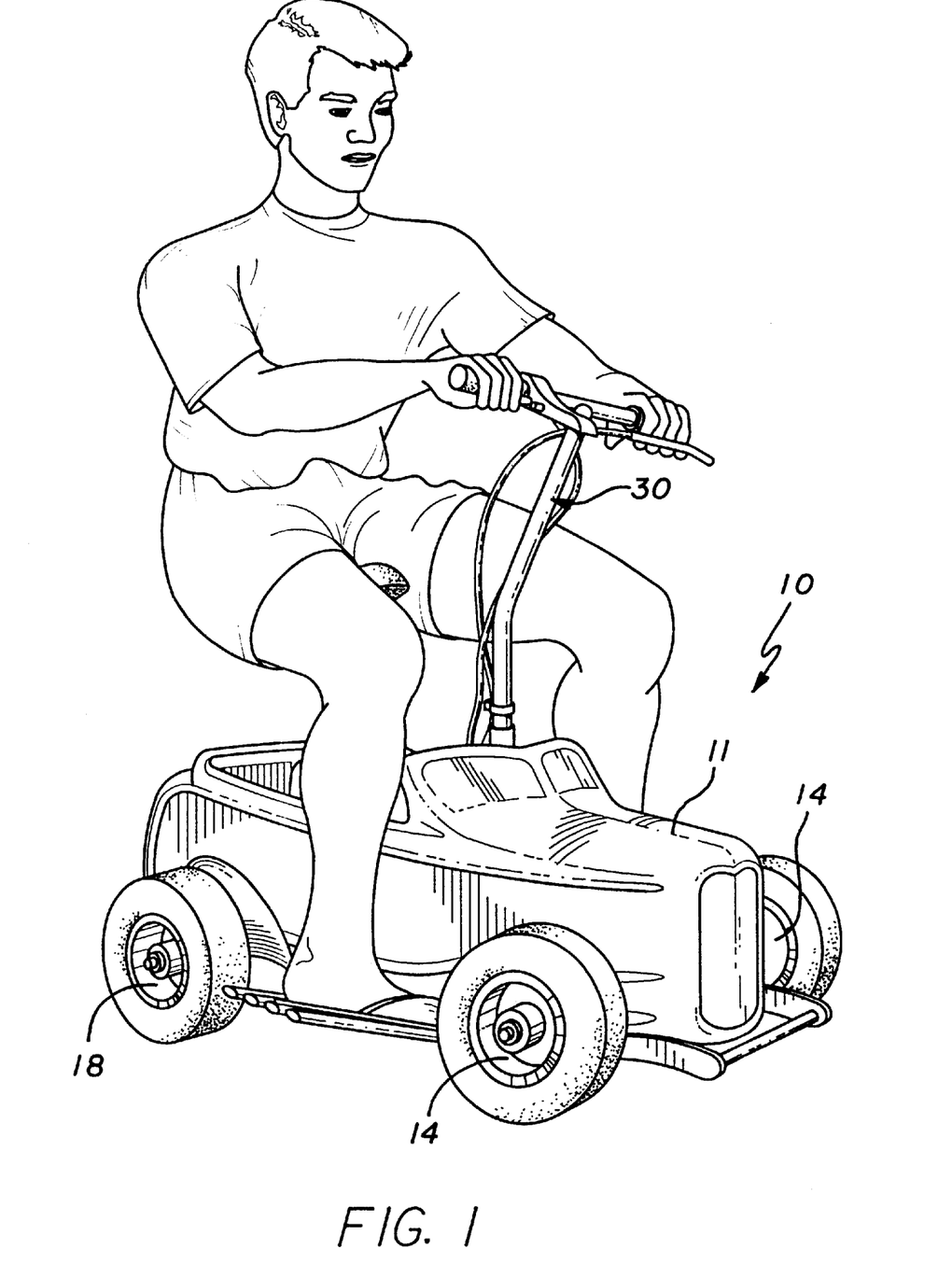
FIG. 1 is a perspective view of a miniaturized motor vehicle according to the invention, showing a driver mounted on the vehicle.
Figure 2:
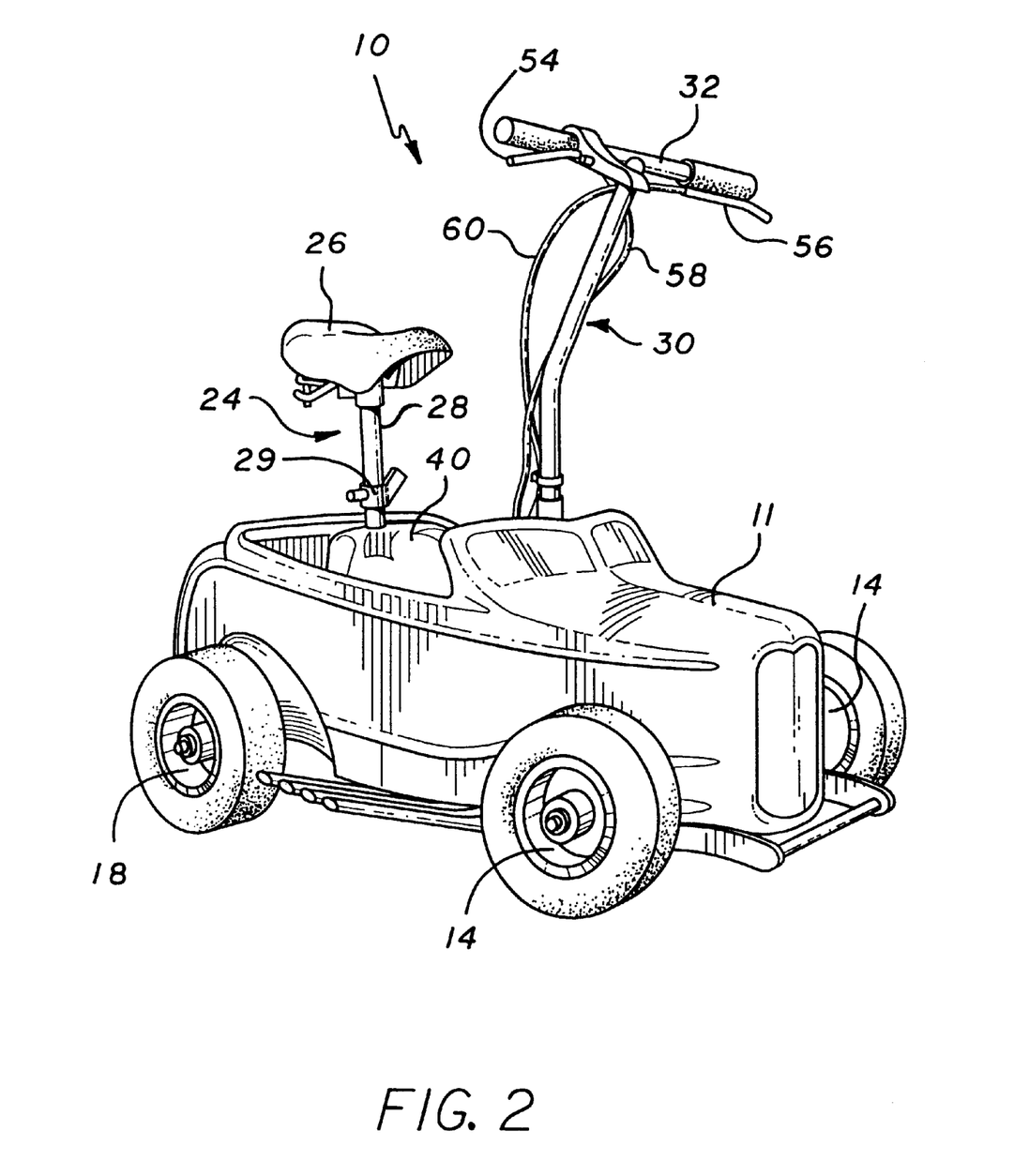
FIG. 2 is a perspective view of the miniaturized motor vehicle of FIG. 1, including an exemplary vehicle body.
Figure 3:
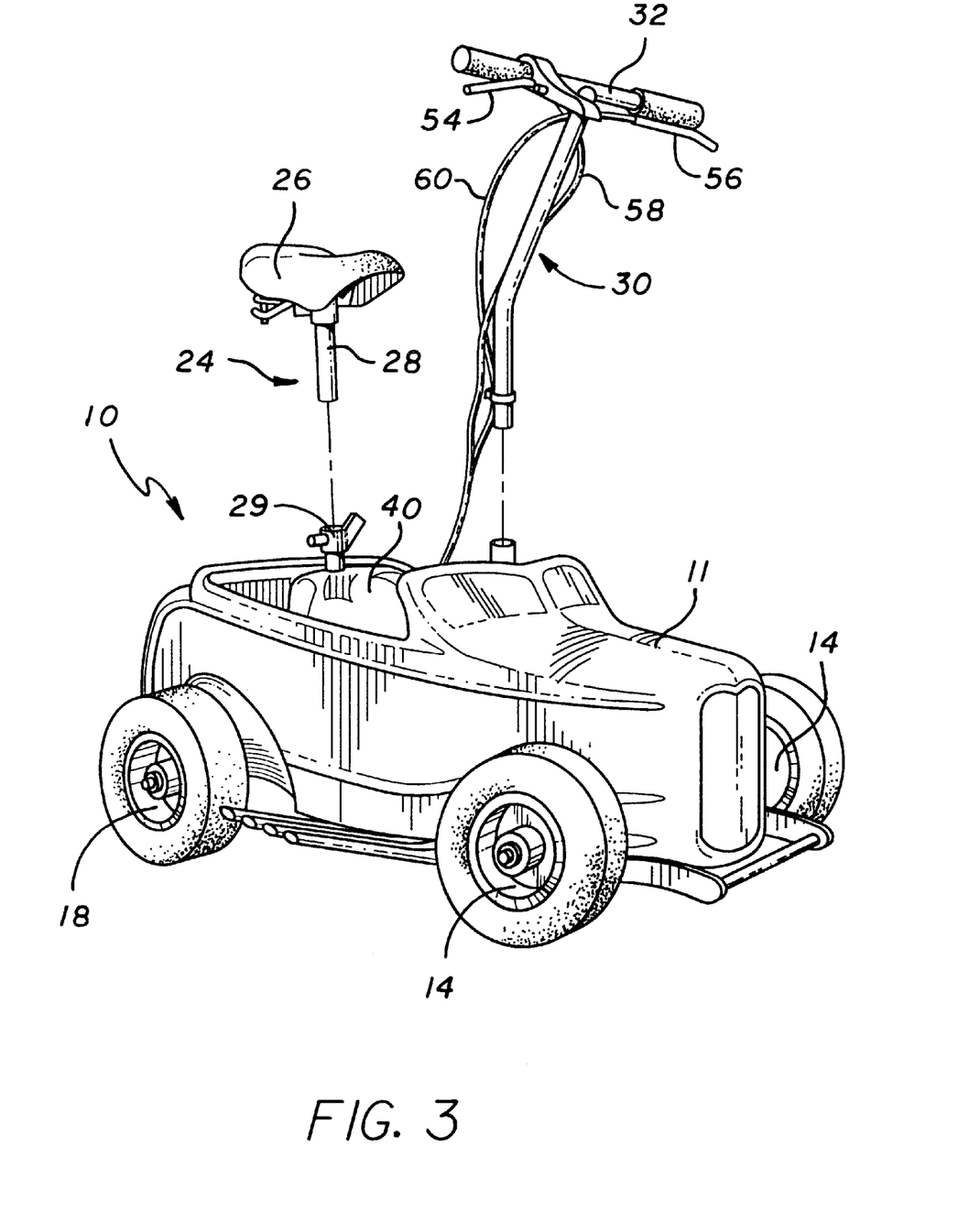
FIG. 3 is a perspective view of the vehicle of FIG. 1 depicting how the seat assembly and steering assembly can be removed from the vehicle.
Figure 4:
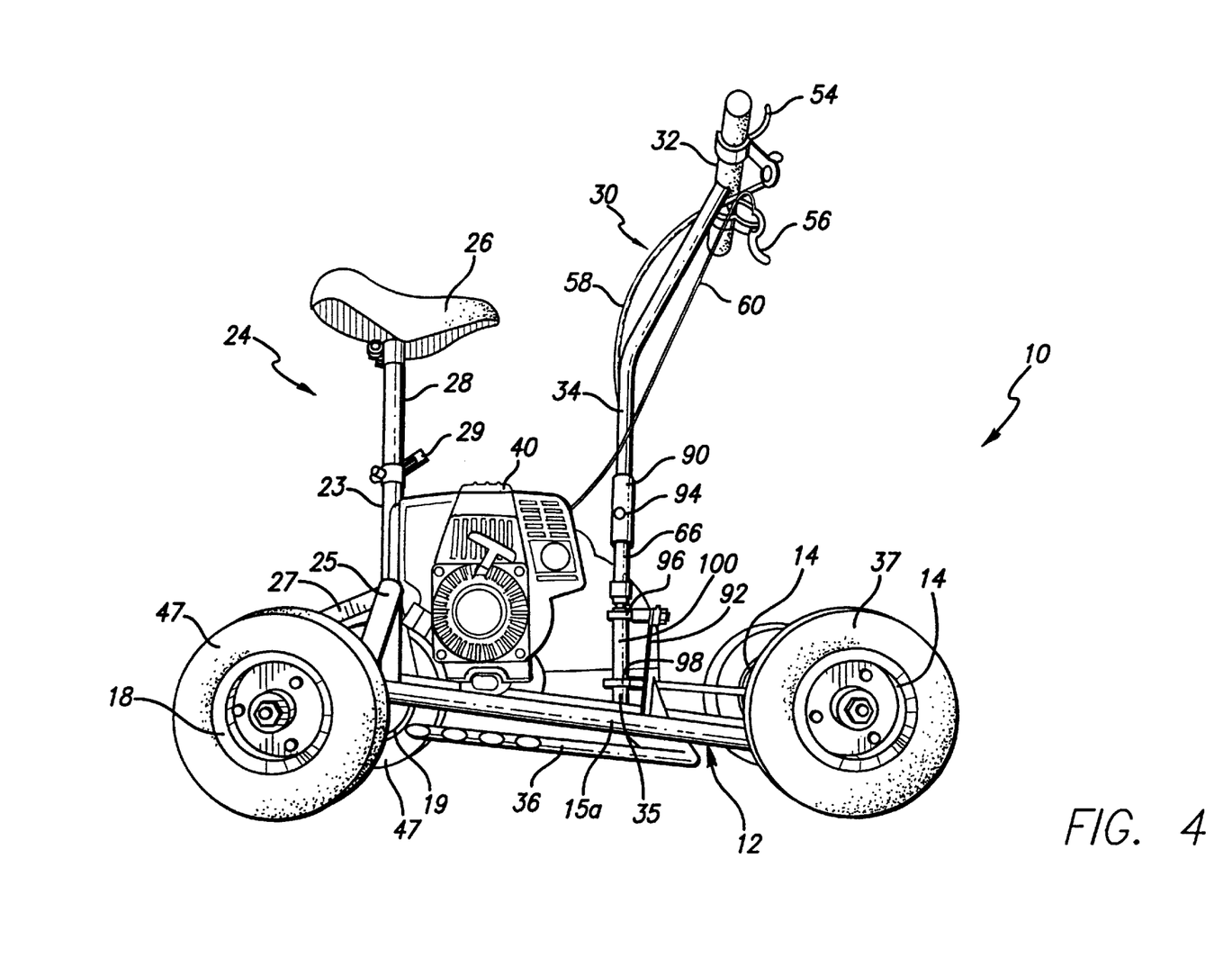
FIG. 4 is an elevational side view of one embodiment of the motor vehicle of FIG. 1, shown without the vehicle body.
Figure 5:
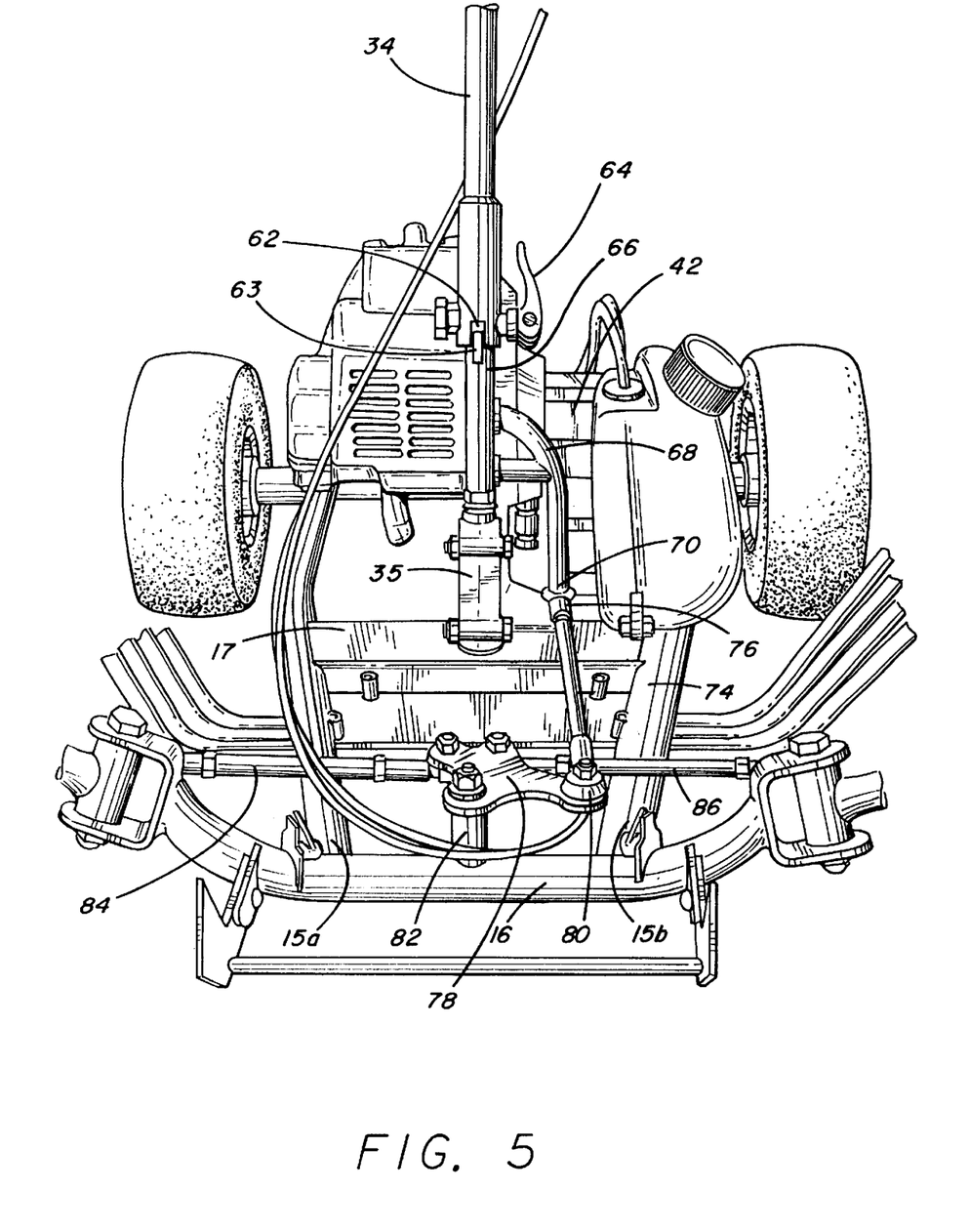
FIG. 5 is a front perspective view of another embodiment of the motor vehicle of FIG. 1, without the vehicle body, showing the preferred configuration of the steering mechanism.
Figure 5A:
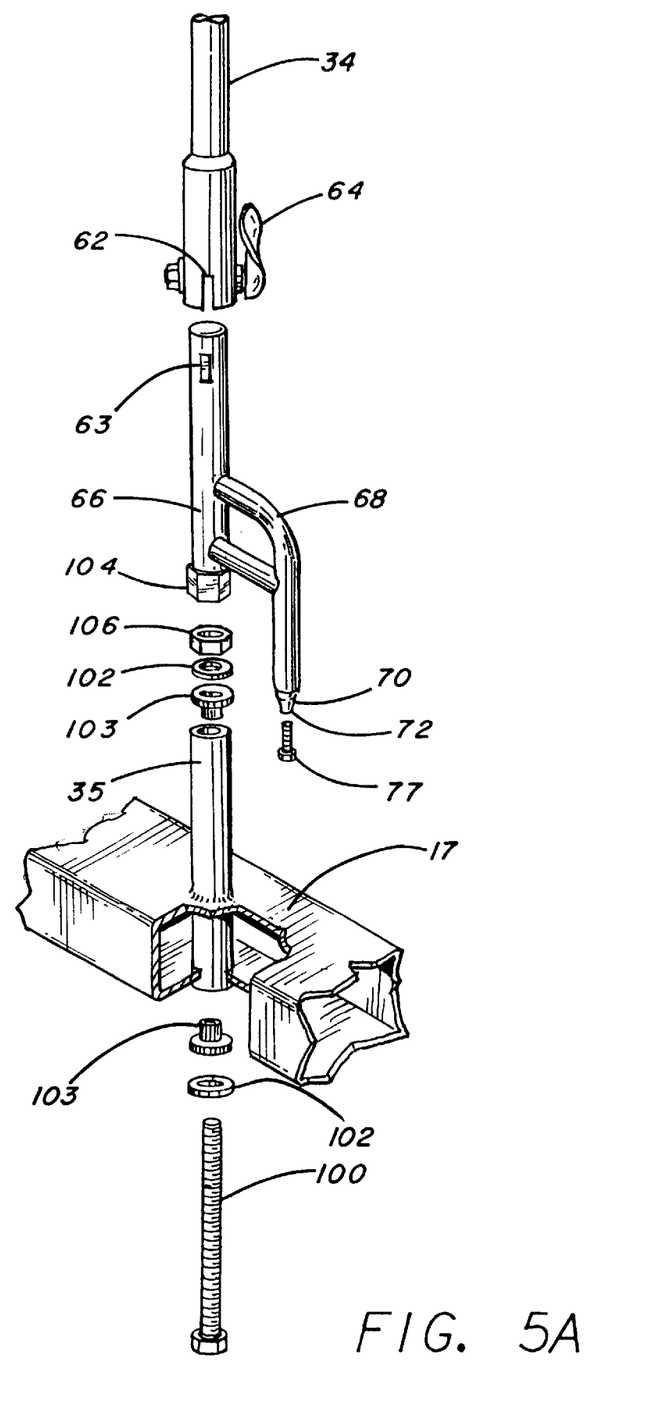
FIG. 5A is an exploded view of a portion of the steering mechanism of the vehicle of FIG. 5.
Figure 5B:
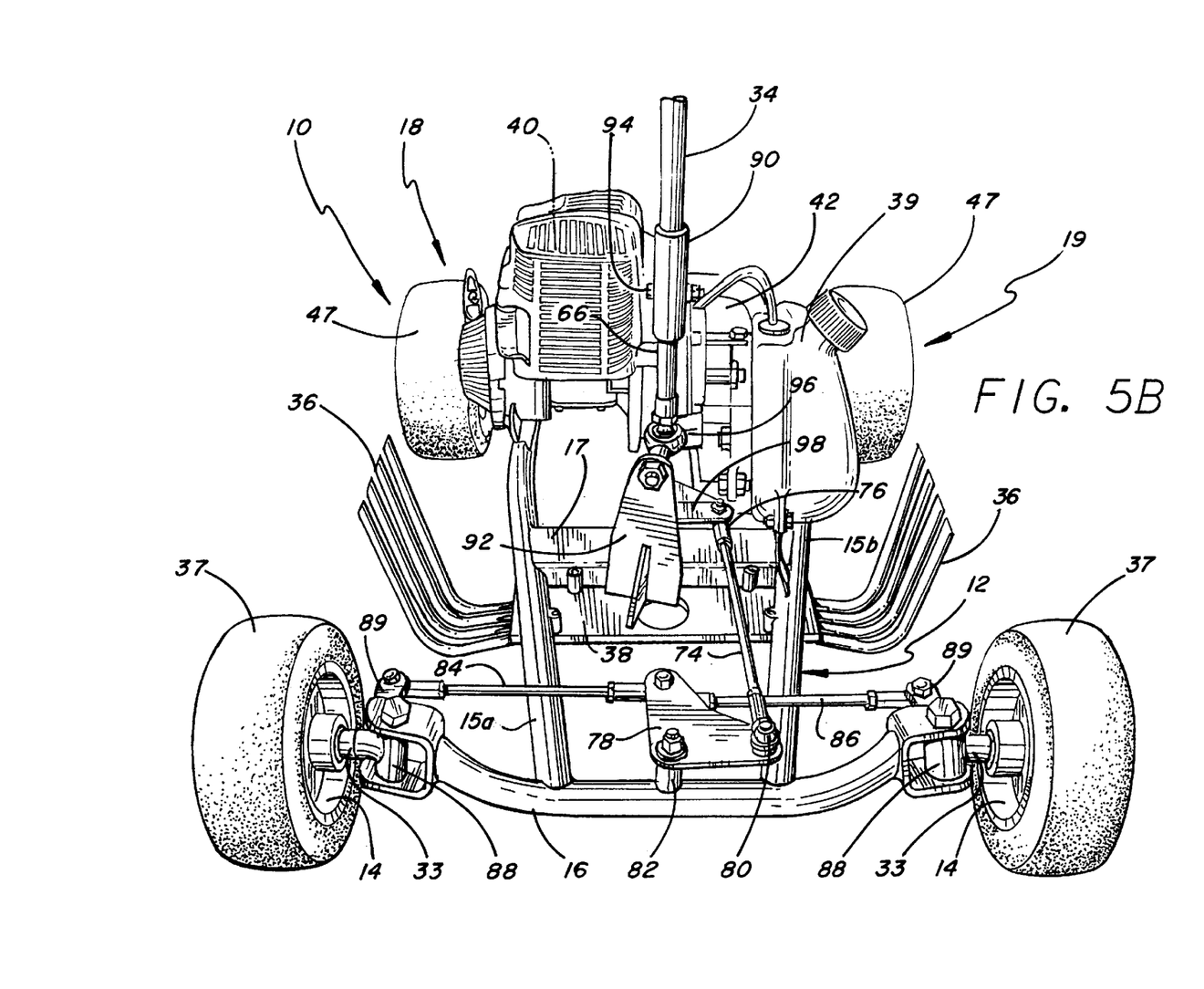
FIG. 5B is a front perspective view of the motor vehicle of FIG. 4, without the vehicle body, showing an alternative configuration of the steering mechanism.

As shown in FIGS. 4, 5 and 5B, the frame 12 includes a generally U-shaped tubular member 13 having a right frame leg 15a and a left frame leg 15b extending toward the front of the vehicle 10, i.e., the open end of the U-shaped member 13 is toward the front of the vehicle 10. The front axle 16 comprises a tubular member that is rigidly fixed across the open end of the U-shaped member 13, preferably by welding the front axle 16 across the front ends of the frame legs 15a, 15b, as shown in FIG. 5. The front axle 16 is of the type typically known as a "drop axle", i.e. the centerline of the front axle 16 is below the imaginary axis that extends through the center of the front wheels 14. The U-shaped member 13 therefore extends in a plane that is slightly declined from the rear axle 20 to the front axle 16. This aids in transferring the driver's weight toward the front of the vehicle and in providing vehicle stability and maneuverability under operation.

A transverse member 17 is rigidly fixed between the frame legs 15a, 15b at a point between the rear axle 20 and the front axle 16. The transverse member 17 comprises a tubular member having a rectangular cross-section and is preferably made of steel. A longitudinal member 21 is rigidly fixed between the closed end of the U-shaped member 13 and the transverse member 17 and is disposed above the rear axle 20 and between and generally parallel to the frame legs 15a, 15b. Preferably the longitudinal member 21 is made of square tubing to allow brackets to be easily mounted to it. The longitudinal member 21 is rigidly fixed to the U-shaped member 13 and the transverse member 17, such as by a weld, bolts or any other conventional means known in the art.

A seat standard 23 extends generally perpendicularly upward from the longitudinal member 21, at a point near the rear axle 20, for receiving the seat assembly 24. The seat standard 23 generally comprises a tubular member adapted to telescopically receive the seat support member 28. A side support member 25 extends from each of the frame legs 15a, 15b to a point on the seat standard 23 above the plane formed by the U-shaped member 13. This provides lateral support for the seat standard 23. In addition, a rear support member 27 is rigidly fixed between the rear end of the longitudinal member 21 and a point on the seat standard 23 above the plane formed by the U-shaped member 13. This provides longitudinal support for the seat standard 23. The seat standard 23 includes a releasable seat clamp 29, which can be opened to allow for height adjustment or removal of the seat 26. The seat 26 can be adjusted in height by opening the clamp 29 and raising or lowering the seat support member 28 within the seat standard 23. In addition, the seat assembly 24 can be removed from the vehicle 10 by opening the seat clamp 29 and sliding the seat support member 28 upward and completely out of the seat standard 23.

A footrest 36 extends outwardly from each frame leg 15a, 15b of the frame 12 to provide a platform for the driver to rest his feet and to more easily shift his weight. Each footrest 36 is fixed to a footrest plate 38, which is rigidly mounted transversely between the frame legs 15a, 15b, preferably by bolting.

The Motor

The motor vehicle 10 is powered by a motor 40, which is mounted to a motor-mounting plate 41. The motor mounting plate 41 is rigidly fixed to the frame 12 between the seat standard 23 and the transverse member 17 and below the seat 26. The center of gravity of the motor 40 is located between the seat standard 23 and the transverse member 17 and below the seat 26. Also, the motor 40 is laterally located on the frame 12 so that the weight of the motor 40 is generally centered between the frame legs 15a, 15b. Locating the motor in this fashion provides the motor vehicle 10 with good stability The motor may be an internal-combustion engine, an electric motor or any other suitable power plant known in the art. If the motor is an internal combustion engine, as shown in FIGS. 4, 5 and 5B, a fuel tank 39 is disposed to one side of the motor 40 between the seat 26 and the frame 12. If the motor 40 is an electric motor, one or more power supplying batteries can be disposed in front of the steering column 34 or in the location where the fuel tank is shown in FIG. 4, or in another suitable location within the frame.

The Drive Train

Figure 5C:
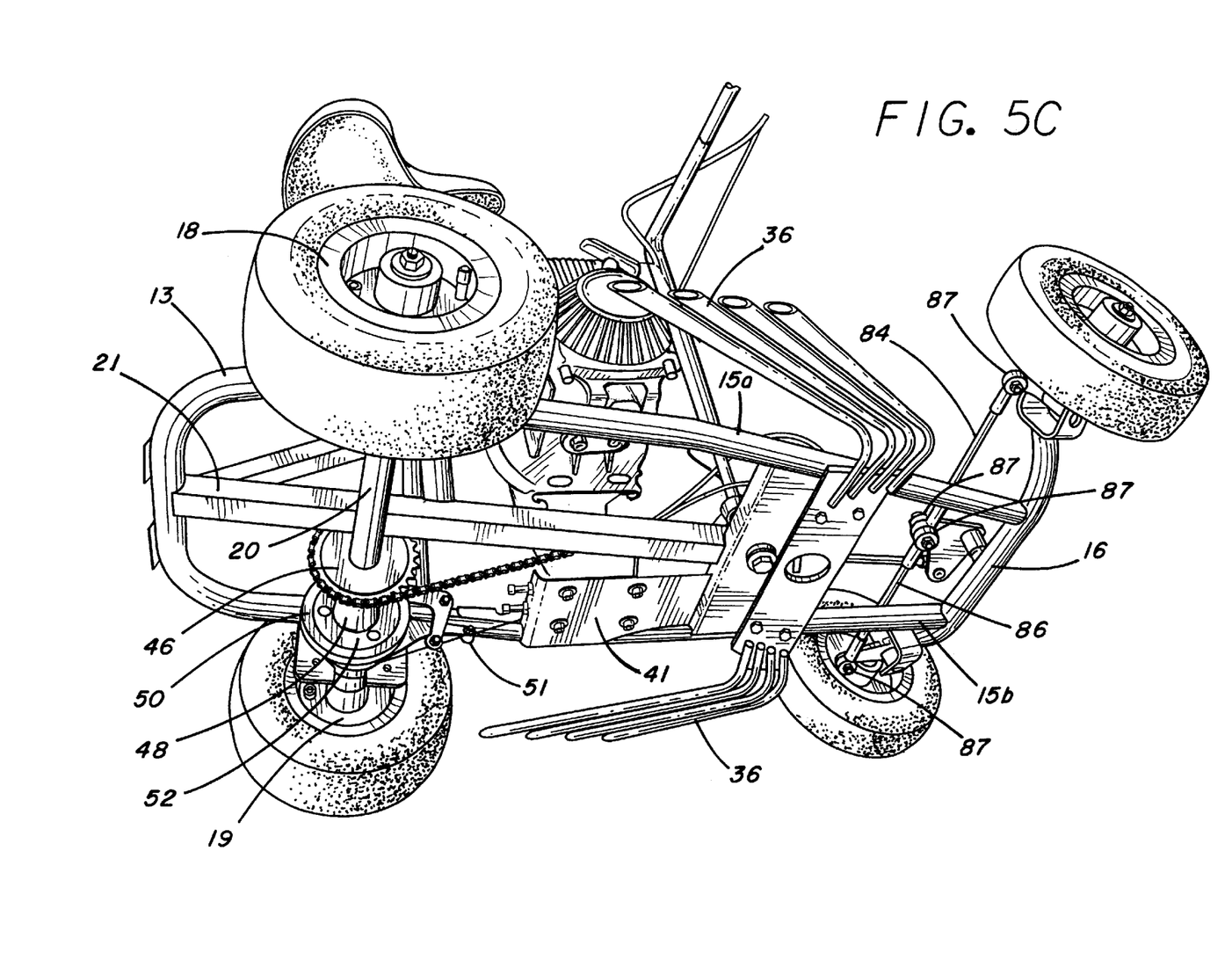
FIG. 5C is a bottom perspective view of the motor vehicle of FIG. 1, without the body.

The motor 40 is coupled to a transmission enclosed in a transmission housing 42, which provides a suitable gear reduction of the engine RPM to a transmission output shaft (not shown). The transmission housing 42 is rigidly mounted to the motor mounting plate 41, preferably by bolting as shown in FIG. 5C. The transmission output shaft is coupled to a drive chain 44. The drive chain 44 is coupled to a drive sprocket 46, which is mounted to the rear axle 20. A clutch selectively engages the motor 40 to the transmission.

Figure 6:
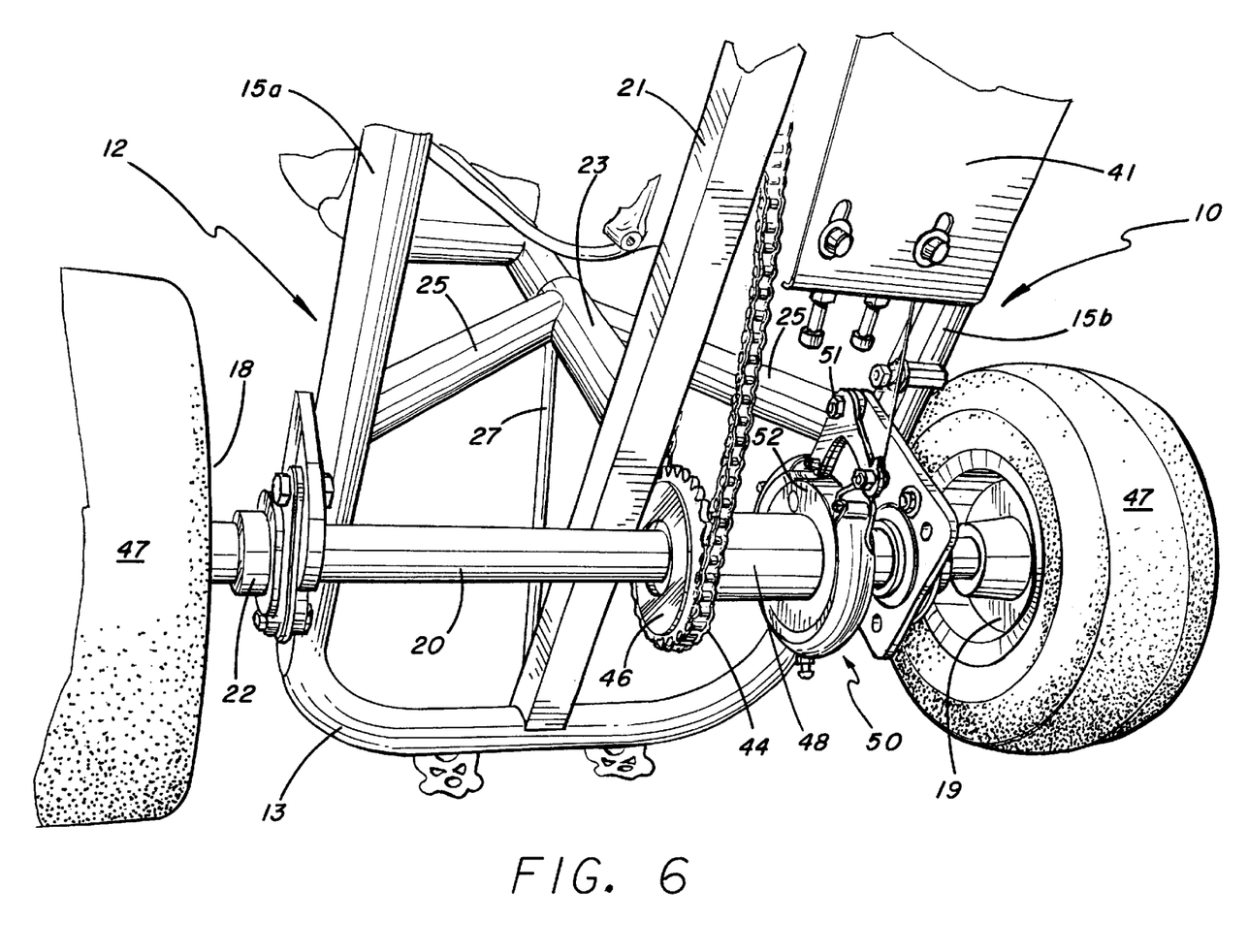
FIG. 6 is an enlarged bottom perspective view of the rear portion of the motor vehicle of FIG. 1.

As previously discussed, the motor 40 can also be an electric motor, which is mounted to the motor mounting plate 41 in a manner similar to that shown in FIG, 5C. An electric motor, however, generally will not have a transmission. The electric motor 40 can be coupled to the rear axle 20 via a chain and drive sprocket arrangement similar to that shown in FIGS. 5C and 6. To reduce noise, however, the electric motor 40 alternatively can be coupled to the rear axle 20 using a combination of pulleys and a drive belt, preferably as follows. A motor pulley is mounted to the output shaft of the electric motor 40 and an axle pulley is mounted to the rear axle 20 in lieu of the drive sprocket 46. The pulleys are coupled by a rubberized cog belt, which is used in lieu of a drive chain 44.

The rear axle 20 is a "live axle," i.e. the entire rear axle rotates from the power of the motor driving the drive sprocket 46. At one end of the rear axle 20 is a rear wheel 18 and at the other end is a rear drive wheel 19. Each of the rear wheels 18, 19 comprises a metal rim adapted to accept a tire mounted on it. Mounted on each rear wheel 18, 19 is a rear tire 47, which is preferably of the rubberized, air-filled tube type. Preferably, the rear tires are wider than the front tires (described below) to provide improved traction and stability under power and braking. The rear drive wheel 19 is rigidly mounted to the rear axle 20 so that it rotates with the axle 20. This provides the power to drive the vehicle and facilitates braking of the vehicle. A brake mechanism 50 is mounted to the frame 12, preferably by steel bolts 51. A brake drum 52 is rigidly mounted to the rear axle 20. In the preferred embodiment, the brake mechanism 50 includes a brake band 53 for applying friction on the brake drum 52 when the brake is actuated, thereby braking the rotation of the rear axle and slowing or stopping the vehicle.

Figure 7:
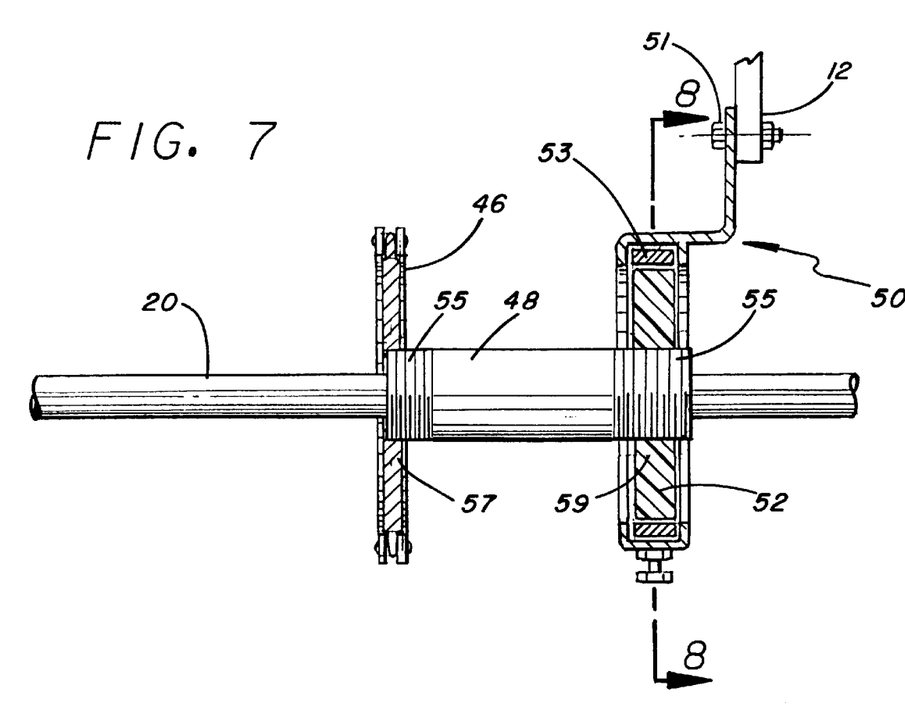
FIG. 7 is a bottom plan view of the rear axle of the motor vehicle of FIG. 1 shown in relationship to the drive sprocket and the brake assembly, which are shown in cross-sectional view.
Figure 8:
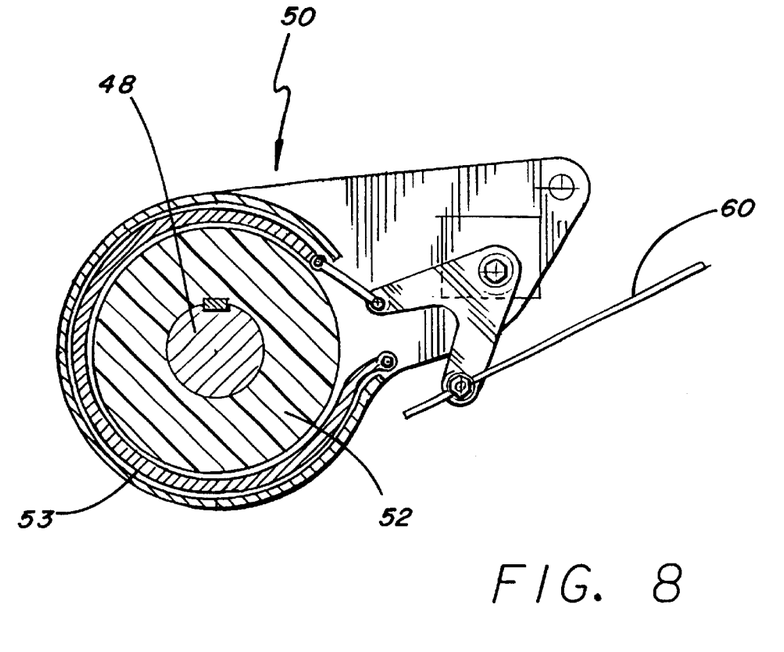
FIG. 8 is a cross-sectional view of the brake assembly of FIG. 7 taken through line 8—8.

In the preferred embodiment, the rear axle 20 is made of aluminum. Referring to FIG. 7, the rear axle 20 includes a section having an enlarged diameter 48. At one end of the enlarged section 48 is rigidly mounted the drive sprocket 46. At the other end of the enlarged section 48 is rigidly mounted the brake drum 52. In the preferred embodiment, a threaded section 55 is provided at each end of the enlarged section 48, and a corresponding threaded hole 57 is provided through the center of the drive sprocket 46. Likewise, a threaded hole 59 is provided through the center of the brake drum 52. Using this structure, the drive sprocket 46 and the brake drum 52 can be mounted to the rear axle 20 by screwing them onto the enlarged section 48.

In the preferred embodiment, the rear drive wheel 19 is rigidly fixed to the rear axle 20. This can be achieved by providing a slot in the end of the rear axle 20 and a corresponding slot that extends through the drive wheel 19. With these slots aligned, a steel rectangular rod is inserted into the slots through the drive wheel 19 and is secured in place by a hub cap, bolt or the like. The other rear wheel 18 is mounted to the rear axle 20 so that it can rotate independently of the rear axle 20. To achieve this, the rear wheel 18 is mounted over the end of the rear axle 20 on oil-impregnated bushings that allow the wheel 18 and axle 20 to turn together or independently. Using this structure, the rear axle 20 and the wheel 18 will turn together unless the shearing force between the bushing and the wheel 18 is great enough to overcome the friction between the bushing and the wheel 18. When that friction is overcome, such as when the vehicle turns through a tight turn, the wheel 18 can turn at a different rate than the axle 20 and the drive wheel 19. This structure provides better maneuverability than if both wheels 18, 19 where rigidly fixed to the axle 20 so that they always turned at the same rate. By using a single drive wheel in this manner, the vehicle has the ability to turn more easily with a relatively short wheel base and to accelerate more easily with only a single wheel to be driven by the axle 20.

The Steering System

At each end of the front axle 16 one of the front wheels 14 is rotatably engaged in to the front axle 16 via a spindle 33, which is mounted to a king pin 88 having a projecting steering arm 89. Each of the front wheels 14 is set using negative camber, i.e., the top of each front wheel 14 is tilted slightly inward. Also, each of the front wheels 14 is set in a "toe out" manner, i.e., the front of each of the front wheels is slightly angled away from the longitudinal centerline of the frame 12. Setting the front wheels 14 in this way further aids lateral stability of the vehicle 10 during operation. A front tire 37 is mounted on each of the front wheels 14. The front tires 37 are preferably of the rubberized, air-filled tube type.

The removable steering assembly 30 includes a steering bar 32 and a steering column 34, which are rigidly fixed together. The steering assembly 30 is coupled in a manner described below to steer the front wheels by turning the steering bar 32. The steering column 34 is bent or arched toward the front wheels 14 at an angle selected to shift the driver's weight forward sufficiently to provide vehicle stability during acceleration and braking. At the end of the steering column 34 opposite the steering bar 32, the steering column 34 is removably fixed to a lower steering shaft 66.

In the presently preferred embodiment, as shown in FIGS. 5 and 5A, the steering column 34 is adapted to fit closely over one end of the lower steering shaft 66. The steering column 34 includes a slot 62 that receives a mating key 63 located on the upper end of the lower steering shaft 66. This structure provides for easy alignment of the steering column 34 and the steering bar 32 with the lower steering shaft 66. A releasable steering clamp 64 is mounted to the steering column 34 for clamping the steering column 34 to the lower steering shaft 66. The steering column 34 can be removed from the lower steering shaft 66 by opening the steering clamp 64 and sliding the steering column 34 upward and completely off the lower steering shaft 66.

A steering upright 35 comprises a metal tube that is rigidly mounted to the transverse member 17. The lower steering shaft 66 is rotatably mounted into the steering upright 35 as explained below. The lower steering shaft 66 includes a projecting arm 68 that projects downward and has an end 70 with a threaded bore 72 therein. The projecting arm end 70 is rotatably coupled to one end of a steering rod 74 using a Heim joint 76. The body of the Heim joint 76 is mounted to one end of the steering rod 74. The ball of the Heim joint 76 is mounted to the projecting arm end 70 by a bolt 77 that is inserted into the threaded bore 72.

The other end of the steering rod 74 is rotatably coupled in a similar manner to a bell crank 78 using another Heim joint 80. The bell crank 78 is rotatably coupled to the front axle 16 at a center point 82 of the axle. A tie rod 84 having a Heim joint 87 mounted at each end is rotatably coupled at one end to the bell crank 78 and at the other end to the steering arm 89. Similarly, another tie rod 86 is rotatably coupled at one end to the bell crank 78 and at the other end to the steering arm 89. By using this structure, the rotation of the steering bar 32 about the axis of the steering column 34 is transferred to the steering bar 74, the bell crank 78, and each of the tie rods 84, 86 and steering arms 89, to turn the king pins 88 and thereby steer the front wheels 14.

FIG. 5A is an exploded view showing how the lower steering shaft 66 is assembled with the steering column 34 and the steering upright 35. As previously explained, the steering column 34 fits over the lower steering shaft 66 so that the slot 62 receives the mating key 63. Closing the clamp 64 locks the steering column 34 to the lower steering shaft 66. The transverse member 17 and the steering upright 35 are designed to provide structural strength. In the preferred embodiment, the transverse member 17 is made of steel and the steering upright 35 is made of thick-walled chromolly tubing. The steering upright 35 is fitted into a bore that extends through the transverse member 17 and is welded to the transverse member 17 on both the top surface and the bottom surface of the transverse member 17. An oil-impregnated bronze bushing 103 is inserted into each end of the steering upright 35.

A bolt 100 extends through a washer 102, through a hole in the transverse member 17 and through the length of the steering upright 35. Another washer 102 is also fitted over the bolt 100, and a nut 106 is screwed onto the bolt 100. Preferably the washers 102 are bronze. The bolt 100 is screwed into a threaded bore 104 in the bottom of the lower steering shaft 66, and the nut 106 is tightened against the bottom of the lower steering shaft 66 to lock the bolt 100 into the lower steering shaft 66. When assembled in this fashion, the bolt 100 is rigidly fixed to the lower steering shaft 66 and the washers 102 form mating surfaces against the bushings 103 that allow the lower steering shaft 66 and the bolt 100 to freely rotate within the steering upright 103.

This structure provides for easy removal, replacement and alignment of the steering column 34. At the same time, it provides a strong and rigid structure for the assembly of the steering bar 32, the steering column 34, the lower steering shaft 66, the steering upright 35 and the transverse member 17. This strength and rigidity allows the structure to be load bearing. Thus, the driver can better maneuver the vehicle by applying weight and leverage to the steering bar 32, which is transferred to the transverse member 17 and the vehicle frame 12 through the described structure.

FIG. 4 and FIG. 5B show an alternative configuration of the lower steering shaft 66. A steering column sleeve 90 is rigidly mounted to the top of the lower steering shaft 66 and is sized to receive the steering column 34. A removable bolt or pin 94 extends through aligned holes in the steering column 34 and the sleeve 90 and holds the steering column 34 in the sleeve 90. A steering brace 92 is rigidly fixed to and extends upwardly from the footrest plate 38 and is offset from the lower steering shaft 66. The steering brace 92 supports a Heim joint 96, which extends perpendicularly from the steering brace to the lower end of the lower steering shaft 66. In this embodiment, the lower steering shaft 66 does not include a projecting arm. The steering upright 35 comprises a short tube that is mounted into the transverse member 17 in a fashion similar to that previously described. The bolt 100 is inserted through the transverse member 17, extends through the steering upright 35 and through a steering arm 98 that is mounted on the bolt 100 using set screws so that the steering arm 98 turns with the bolt 100. The bolt 100 is also inserted through the ball of the Heim join 96 into a threaded hole in the bottom of the lower steering shaft 66 and is locked in place using a nut similar to that previously described. The steering arm 98 projects perpendicularly from shaft of the bolt 100 and is rotatably coupled to the steering rod 74 by the Heim joint 76. The steering rod 74 is coupled to the front wheels 14 in a manner similar to that previously described.

Referring again to FIG. 4, mounted on the steering bar 32 are a throttle control 54 and a brake control 56 for controlling the accelerator and brake mechanism, respectively. In the preferred embodiment, each of the throttle control 54 and the brake control 56 is of the squeeze-lever type. The controls 54, 56 are located at laterally opposite positions on the steering bar 32 so that each of them can be operated by one of the driver's hands. The throttle lever 54 is coupled to a throttle cable 58, which is coupled to the throttle of motor 40 in a known manner for controlling the acceleration of the vehicle. The brake lever 56 is coupled to a brake cable 60, which is coupled to the brake mechanism 50 for controlling braking of the vehicle. The levers 54, 56 are spring-loaded so that the driver has to actively squeeze them to accelerate or brake the vehicle.

The Prototype

I have manufactured miniaturized motor vehicles in accordance with my invention, which is very small in size, is lightweight and is readily transportable (e.g., in the trunk of a normal automobile). The seat 26 is of the saddle type, which allows the driver to readily shift his weight while operating the vehicle. The U-shaped member 13, the frame legs 15a, 15b, the seat standard 23, the side support members 25 and the front axle 16 are made of one-inch, round seamless steel tubing. The longitudinal member 21 and the rear support member 27 are made of one-inch square steel tubing. The frame members are rigidly connected using welded construction. The approximate external dimensions of the vehicle are 26 inches wide, by 42 inches long, by 19 inches high (with the steering assembly 30 and the seat assembly 24 removed). The wheelbase is approximately 24 inches. The weight of the vehicles is from approximately 30 pounds to approximately 50 pounds, including the body 11 the steering assembly 30 and the seat assembly 24. Notwithstanding their small size, the vehicles have excellent stability and maneuverability in very small areas.

The motor 40 is a gasoline-powered two-cycle engine. The transmission provides a 5:1 gear reduction of the engine RPM to the output shaft 43 on the transmission. The clutch is a 78 mm centrifugal clutch.

The body of the prototype vehicles is a miniature molded fiberglass reproduction of a roadster. It will be understood, however, that many other body styles (e.g., a grand national stock car, monoplane or any other body style) can be used, provided that they are appropriately sized to fit the vehicle chassis and accommodate the other elements of the vehicle.

The above-described structural features of the motor vehicle in accordance with my invention possess several advantages. They provide a small, high-visibility, four-wheeled motorized vehicle. The vehicle is lightweight and can be easily stored or transported in a small space, such as in the trunk of a standard automobile. While being small in size and lightweight, the vehicle is capable of transporting a grown adult in a seated position and can be readily and conveniently adjusted to accommodate drivers of various sizes, from children to adults. Also, the vehicle is very stable and maneuverable.

Additional advantages and modifications will readily occur to those skilled in the art. For example, while certain frame members have been described as being rigidly fixed to each other by welding, it will be understood that the frame structure can be provided by casting the frame, bolting frame members together or using any other conventional means known in the art for connecting frame members. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A highly maneuverable and stable small sized motorized four wheel vehicle for transporting children or adults, said four wheel vehicle comprising in combination:

a) a frame;

b) a front drop axle for supporting a front wheel at each opposed end and for canting said frame forwardly downwardly;

c) a steering assembly for turning said front wheels, said steering assembly including a steering column extending up and canted forwardly, said steering column being adapted to swing a rider's upper body in the direction of a turn to shift the center of gravity laterally into the turn;

d) a rear live axle for supporting a rear wheel at each opposed end, one of said rear wheels being rigidly attached to said live axle and the other of said rear wheels being attached to said live axle through a friction fitting adapted to accommodate independent rotation of said other rear wheel relative to said one rear wheel;

e) a seat assembly for supporting the rider, said seat assembly including a seat standard mounted forwardly of said live axle;

f) a motor mounted on said frame at a location intermediate said seat standard and said steering assembly and at essentially the lateral midpoint of said frame, which location is adapted to be close to the center of gravity of said vehicle; and g) a drive train interconnecting said motor with said live axle, said drive train including a centrifugal clutch mounted on said live axle to cause rotation of said one rear wheel.

2. The four wheel vehicle as set forth in claim 1 including a manually operated clamp for disengagably engaging a part of said steering assembly with said frame.

3. The four wheel vehicle as set forth in claim 2 wherein said clamp is adapted to accommodate extension and retraction of said steering assembly to a selectable height.

4. The four wheel vehicle as set forth in claim 1 including a manually operated clamp for disengagably engaging a part of said seat assembly with said frame.

5. The four wheel vehicle as set forth in claim 4 wherein said clamp is adapted to accommodate extension and retraction of said seat assembly to a selectable height.

6. The four wheel vehicle as set forth in claim 4 including a manually operated clamp for disengagably engaging a part of said steering assembly with said frame.

7. The four wheel vehicle as set forth in claim 1 including a footrest disposed at each opposed side of said frame intermediate said drop axle and said live axle for supporting the rider's foot.

8. The four wheel vehicle as set forth in claim 1 including a fiberglass body mounted on said frame, said body being adapted to accommodate extension of said steering assembly and said seat assembly above said body.

9. The four wheel vehicle as set forth in claim 1 wherein said front and rear wheels include tires, said tires of said rear wheels being of a width greater than the width of said tires of said front wheels.

10. The four wheel vehicle as set forth in claim 1 including a manually operated brake for braking rotation of said live axle.

11. The four wheel vehicle as set forth in claim 1 wherein said live axle includes a diametrically enlarged section for supporting said clutch and including a manually operated brake adapted to brake rotation of said enlarged section.

12. The four wheel vehicle as set forth in claim 1 wherein each of said front wheels is set to a negative camber.

13. The four wheel vehicle as set forth in claim 1 wherein each of said front wheels is set with toe out.

14. The four wheel vehicle as set forth in claim 13 wherein each of said front wheels is set to a negative camber.

15. A highly maneuverable and stable small sized motorized four wheel vehicle for transporting children or adults, said four wheel vehicle comprising in combination:

a) a frame;

b) a front drop axle for supporting a front wheel at each opposed end and for canting said frame forwardly downwardly;

c) a steering assembly for turning said front wheels, said steering assembly including a steering column extending up and canted forwardly, said steering column being adapted to swing a rider's upper body in the direction of a turn to shift the center of gravity laterally into the turn;

d) a rear live axle for supporting a rear wheel at each opposed end;

e) a seat assembly for supporting the rider, said seat assembly including a seat standard mounted forwardly of said live axle;

f) a motor mounted on said frame at a location intermediate said seat standard and said steering assembly and at essentially the lateral midpoint of said frame, which location is adapted to be close to the center of gravity of said vehicle; and g) a drive train interconnecting said motor with said live axle, said drive train including a centrifugal clutch mounted on said live axle to cause rotation of said one live axle.

16. The four wheel vehicle as set forth in claim 15 including a manually operated clamp for disengagably engaging a part of said steering assembly with said frame.

17. The four wheel vehicle as set forth in claim 16 wherein said clamp is adapted to accommodate extension and retraction of said steering assembly to a selectable height.

18. The four wheel vehicle as set forth in claim 15 including a manually operated clamp for disengagably engaging a part of said seat assembly with said frame.

19. The four wheel vehicle as set forth in claim 18 wherein said clamp is adapted to accommodate extension and retraction of said seat assembly to a selectable height.

20. The four wheel vehicle as set forth in claim 18 including a manually operated clamp for disengagably engaging a part of said steering assembly with said frame.

21. The four wheel vehicle as set forth in claim 15 wherein said front and rear wheels include tires, said tires of said rear wheels being of a width greater than the width of said tires of said front wheels.

22. The four wheel vehicle as set forth in claim 15 including a manually operated brake for braking rotation of said live axle.

23. The four wheel vehicle as set forth in claim 15 wherein said live axle includes a diametrically enlarged section for supporting said clutch and including a manually operated brake adapted to brake rotation of said enlarged section.

24. The four wheel vehicle as set forth in claim 15 wherein each of said front wheels is set to a negative camber.

25. The four wheel vehicle as set forth in claim 15 wherein each of said front wheels is set with toe out.

26. The four wheel vehicle as set forth in claim 25 wherein each of said front wheels is set to a negative camber.

27. A highly maneuverable and stable small sized motorized four wheel vehicle for transporting children or adults, said four wheel vehicle comprising in combination:

a) a frame;

b) a front axle for supporting a front wheel at each opposed end;

c) a steering assembly for turning said front wheels, said steering assembly including a steering column extending up and canted forwardly, said steering column being adapted to swing a rider's upper body in the direction of a turn to shift the center of gravity laterally into the turn;

d) a rear live axle for supporting a rear wheel at each opposed end, one of said rear wheels being rigidly attached to said live axle and the other of said rear wheels being attached to said live axle through a friction fitting adapted to accommodate independent rotation of said other rear wheel relative to said one rear wheel;

e) a seat assembly for supporting the rider, said seat assembly including a seat standard mounted forwardly of said live axle;

f) a motor mounted on said frame at a location intermediate said seat standard and said steering assembly and at essentially the lateral midpoint of said frame, which location is adapted to be close to the center of gravity of said vehicle; and g) a drive train interconnecting said motor with said live axle, said drive train including a centrifugal clutch mounted on said live axle to cause rotation of said one rear wheel.

28. The four wheel vehicle as set forth in claim 27 including a manually operated clamp for disengagably engaging a part of said steering assembly with said frame.

29. The four wheel vehicle as set forth in claim 28 wherein said clamp is adapted to accommodate extension and retraction of said steering assembly to a selectable height.

30. The four wheel vehicle as set forth in claim 27 including a manually operated clamp for disengagably engaging a part of said seat assembly with said frame.

31. The four wheel vehicle as set forth in claim 30 wherein said clamp is adapted to accommodate extension and retraction of said seat assembly to a selectable height.

32. The four wheel vehicle as set forth in claim 30 including a manually operated clamp for disengagably engaging a part of said steering assembly with said frame.

33. The four wheel vehicle as set forth in claim 27 wherein said front and rear wheels include tires, said tires of said rear wheels being of a width greater than the width of said tires of said front wheels.

34. The four wheel vehicle as set forth in claim 27 including a manually operated brake for braking rotation of said live axle.

35. The four wheel vehicle as set forth in claim 27 wherein said live axle includes a diametrically enlarged section for supporting said clutch and including a manually operated brake adapted to brake rotation of said enlarged section.

36. The four wheel vehicle as set forth in claim 27 wherein each of said front wheels is set to a negative camber.

37. The four wheel vehicle as set forth in claim 27 wherein each of said front wheels is set with toe out.

38. The four wheel vehicle as set forth in claim 37 wherein each of said front wheels is set to a negative camber.

* * * * *